United States Patent
Lazer (10) Patent No.: US 10,635,397 B2
(45) Date of Patent: Apr. 28, 2020

(54) SYSTEM AND METHOD FOR LONG ADDITION AND LONG MULTIPLICATION IN ASSOCIATIVE MEMORY

(71) Applicant: GSI Technology Inc., Sunnyvale, CA (US)

(72) Inventor: Moshe Lazer, Binyamina (IL)

(73) Assignee: GSI Technology Inc., Sunnyvale, CA (US)

( * ) Notice: Subject to any disclaimer, the term of this patent is extended or adjusted under 35 U.S.C. 154(b) by 95 days.

(21) Appl. No.: 15/915,113

(22) Filed: Mar. 8, 2018

(65) Prior Publication Data

US 2019/0278566 A1    Sep. 12, 2019

(51) Int. Cl.
*G06F 7/533* (2006.01)
*G06F 7/501* (2006.01)

(52) U.S. Cl.
CPC .............. *G06F 7/533* (2013.01); *G06F 7/501* (2013.01)

(58) Field of Classification Search
CPC ................................. G06F 7/533; G06F 7/501
USPC .................................................. 708/620–632
See application file for complete search history.

(56) References Cited

U.S. PATENT DOCUMENTS

| | | | |
|---|---|---|---|
| 8,238,173 B2 | 8/2012 | Akerib et al. | |
| 9,418,719 B2 | 8/2016 | Akerib et al. | |
| 9,558,812 B2 | 1/2017 | Akerib | |
| 2015/0131383 A1 | 5/2015 | Akerib et al. | |
| 2017/0316829 A1 | 11/2017 | Ehrman et al. | |
| 2018/0157621 A1* | 6/2018 | Shu | G06F 7/506 |

* cited by examiner

*Primary Examiner* — Tan V Mai
(74) *Attorney, Agent, or Firm* — Heidi Brun Associates Ltd.

(57) ABSTRACT

A method for an associative memory device includes replacing a set of three multi-bit binary numbers P, Q and R, stored in the associative memory device, with two multi-bit binary numbers X and Y, also stored in the associative memory device, wherein a sum of the binary numbers P, Q and R is equal to a sum of the binary numbers X and Y. A system includes an associative memory array having rows and columns and a multi-bit multiplier. Each column of the array stores two multi-bit binary numbers to be multiplied. The multi-bit multiplier multiplies, in parallel, the two multi-bit binary numbers per column by concurrently processing all bits of partial products generated by the multiplier. The multiplier performs the processing without any carry propagation delay when adding all but the last two partial products.

12 Claims, 13 Drawing Sheets

```
P         0 1 1 0 1 0 1 1
Q         0 1 0 1 0 1 1 1
R       + 1 1 1 1 1 0 1 1
         -------------------
result    1 0 1 1 1 1 0 1

X         1 0 0 0 0 0 1 1
Y       + 0 1 1 1 1 0 1 1
         -------------------
result    1 0 1 1 1 1 0 1
```

SYSTEM AND METHOD FOR LONG ADDITION AND LONG MULTIPLICATION IN ASSOCIATIVE MEMORY

FIELD OF THE INVENTION

The present invention relates to associative memory devices generally and to arithmetic operations in associative memory devices in particular.

BACKGROUND OF THE INVENTION

In existing computation devices, a dedicated electronic circuit may be used to multiply two binary numbers. In the multiplication electronic circuit, the digital multipliers may be implemented in a variety of techniques; most of them involve computing a set of partial products, and then summing the partial products together. This process is similar to the method taught to primary schoolchildren for conducting long multiplication on decimal numbers.

In each step of the multiplication process of decimal numbers, the partial product represents the multiplication result between a multiplicand and a different digit of a multiplier. As known, the right most digit represents the number of "ones" ($10^0$) of a number, the next digit represents the number of "tens" ($10^1$) and so forth with the rest of the digits representing hundreds ($10^2$), thousands ($10^3$) etc. Therefore, the first partial product represent the number of "ones" in the final result, the second partial product represents the number of "tens" in the final result and so forth with the rest of the partial products. As each partial product represents a different power of 10, each new partial product is shifted one location to the left with respect to the previous partial product.

Figure 1:
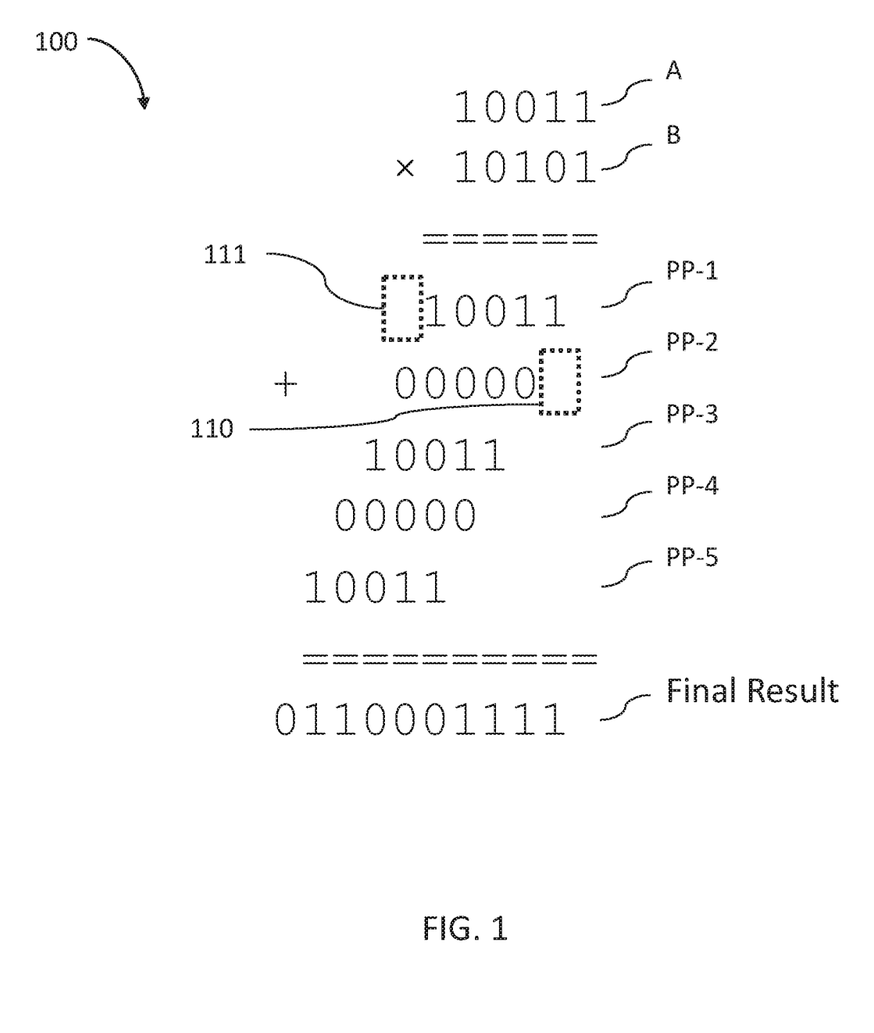
FIG. 1 is an illustration of an exemplary multi-bit multiplication between two 5-bit binary numbers.

A similar procedure is employed for multiplying multi-bit binary numbers as illustrated in FIG. 1 to which reference is now made. Multi-bit multiplication 100 is an example in which A is the multiplicand and B is the multiplier in a multiplication operation between two 5-bit binary numbers. In each step, multiplicand A is multiplied by one bit of multiplier B, starting with the left most bit of B, and the result of each step is a partial product (PP). The value of the $k^{th}$ partial product is computed by multiplying bit k of multiplier B by A and by ($2^k$). The first partial product represents the value of bit 0 of multiplier B multiplied by A and by)($2^0$). The next PP represents the value of bit 1 of multiplier B multiplied by A and by ($2^1$). The next PP represents the value of bit 2 of multiplier B multiplied by A and by $2^2$ and so on. The multiplication by $2^k$ is equivalent to shifting k times to the left.

The first partial product PP-1 is the result of multiplying bit 0 of B and is not shifted. The second partial product PP-2 is the result of multiplying bit 1 of B therefore, PP-2 is shifted one location to the left with respect to PP-1. An empty space 110 is created by the left shift in the Least Significant Bit (LSB) position of PP-2, and an empty space 111 may be perceived in the Most Significant Bit (MSB) position of PP-1. A similar procedure is done with respect to the third, fourth and fifth digits of B, providing PP-3, PP-4 and PP-5, each shifted one location to the left with respect to the previous partial product, i.e. each multiplied by the relevant power of 2.

It may be appreciated that the value of empty spaces 110 and 111 is 0, as is the value of all other empty spaces of all partial products created during multiplication in both the LSB and MSB positions.

It may be appreciated that the value of a bit of multiplier B may be either 0 or 1; therefore, the value of each partial product may be either 0 or A: If the value of a bit from B is 0, then the value of the resultant partial product may be 0, and if the value of a bit from B is 1, then the value of the resultant partial product is A.

After all bits of B have been processed, a sum of all partial products is calculated. The number of partial products is the number of bits in B, and the sum may be calculated by repeatedly using a standard multi-bit adder with carry propagation (not shown in the figure) between any two partial products to provide the final result. It may be noted that the "empty" locations in the rightmost bits of a partial product actually have the value "0" such that, for example, the value of PP-3 represented by the number 10011 shifted two positions to the left is actually 1001100.

It may be appreciated that the sum of all partial products is done by performing an add operation between each pair of partial products, one bit at a time to enable the carry to propagate from the LSB to the MSB. This may provide a complexity of O(n) for each sum operation. The number of partial products is n; therefore, the complexity of the complete multiplication operation may be O($n^2$), i.e. the number of partial products—n (which is the number of bits of the multiplier which defines the number of add operations) multiplied by the number of bits of each partial product—n (the number of bits of the multiplicand participating in each add operation).

The number of bits resulting from a multiplication operation between two n-bit numbers may be 2n–1 or 2n.

It may be appreciated that the concurrent multi-bit adder defined in U.S. patent application Ser. No. 15/690,301, now issued as U.S. Pat. No. 10,402,165, entitled "CONCURRENT MULTI-BIT ADDER", assigned to the common assignee of the present invention and incorporated here by reference, may improve the complexity of the add operation by operating concurrently on groups of bits, but may not provide concurrent operations on all bits and may provide a complexity proportional to the number if groups of bits which is >1.

It may be appreciated that the number of bits of the multiplier does not have to be identical to the number of bits of the multiplicand. When the sizes are n and m, the complexity of the multiplication may be O(mn).

SUMMARY OF THE PRESENT INVENTION

There is provided, in accordance with a preferred embodiment of the present invention, a method for an associative memory device. The method includes replacing a set of three multi-bit binary numbers P, Q and R, stored in an associative memory device, with two multi-bit binary numbers X and Y, also stored in the associative memory device, wherein a sum of the binary numbers P, Q and R is equal to a sum of the binary numbers X and Y.

Moreover, in accordance with a preferred embodiment of the present invention, the method also includes having a plurality of sets i of three multi-bit binary numbers $P_i$, $Q_i$ and $R_i$ and concurrently performing the replacing on the plurality of sets i.

Furthermore, in accordance with a preferred embodiment of the present invention, the replacing includes concurrently, for each location j of binary numbers P, Q and R, placing a first bit in a location j of the binary number X and a second bit in a location k of the binary number Y. The first bit is a sum bit and the second bit is a carry bit according to a full adder truth table, and location k represents a value greater by a power of two than the value in location j.

Still further, in accordance with a preferred embodiment of the present invention, the method also includes having n multi-bit binary addends. The method includes repeatedly performing the replacing on sets of three of the multi-bit binary addends until there are only two final multi bit binary addends left and performing a standard multi bit add operation on the final two multi bit binary addends providing a sum of the n multi-bit binary addends.

Additionally, in accordance with a preferred embodiment of the present invention, the method also includes having two multi-bit binary numbers to be multiplied. For this, the method includes initially putting bits of a first partial product of the two multi-bit binary numbers into the binary number P and bits of a second partial product into the binary number Q. The method includes placing bits of a next partial product in the binary number R, performing the replacing, putting bits of the multi-bit binary number X into the multi-bit binary number P and bits of the multi-bit binary number Y into the multi-bit binary number Q. The method includes repeating the placing, performing and putting until the next partial product is a last partial product, and performing a standard multi bit add operation on the multi-bit binary numbers P and Q thereby providing a result of a multiplication operation between the two multi-bit binary numbers.

Furthermore, in accordance with a preferred embodiment of the present invention, the first performing includes placing a most significant bit (MSB) of the multi-bit binary number R in a temporary location in the associative memory device, storing a least significant bit (LSB) of the multi-bit binary number P in a first free location of said result, starting from the LSB of the result, and placing a bit from the temporary location as an MSB of the multi-bit binary number P, thereby keeping a constant number of bits in each of the multi-bit binary numbers P, Q and R.

There is provided, in accordance with a preferred embodiment of the present invention, a system which includes an associative memory array arranged in rows and columns and a 3 to 2 replacer. The associative memory array stores three original multi-bit binary numbers P, Q and R in each column of the associative memory array. The 3 to 2 replacer concurrently replaces, in parallel in all columns, the original multi-bit binary numbers P, Q and R with two replacement multi-bit binary numbers X and Y. A sum of the original multi-bit binary numbers P, Q and R is equal to a sum of the replacement multi-bit binary numbers X and Y.

Additionally, in accordance with a preferred embodiment of the present invention, concurrently for each bit j of multi-bit binary numbers P, Q and R stored in each column, the 3 to 2 replacer places a first bit in a location j of the multi-bit binary number X and a second bit in a location k of the multi-bit binary number Y. The first bit is a sum bit and the second bit is a carry bit according to a full adder truth table, and the location k stores a value greater by a power of two than the value stored in location j.

Furthermore, in accordance with a preferred embodiment of the present invention, the associative memory array stores a plurality of multi-bit binary addends and the system also includes a variable reducer and a multi-bit adder. The variable reducer repeatedly activates the 3 to 2 replacer on groups of three multi-bit binary numbers, wherein each group includes a first, a second and a third multi-bit binary addend from the plurality of multi-bit binary addends, until there are only two final multi-bit binary addends left. The multi-bit adder calculates a sum of the final two multi bit binary addends and thereby provides a sum of the plurality of multi-bit binary addends.

Still further, in accordance with a preferred embodiment of the present invention, the associative memory array stores a pair of multi-bit binary numbers to be multiplied and also includes a multi-bit multiplier. The multi-bit multiplier generates partial products of the pair, activates the variable reducer on the partial products and activates the multi bit adder to provide a multiplication result between the pair.

There is provided, in accordance with a preferred embodiment of the present invention, a system which includes an associative memory array having rows and columns and a multi-bit multiplier. Each column of the array stores two multi-bit binary numbers to be multiplied. The multi-bit multiplier multiplies, in parallel, the two multi-bit binary numbers per column by concurrently processing all bits of partial products generated by the multiplier. The multiplier performs the processing without any carry propagation delay when adding all but the last two partial products.

There is provided, in accordance with a preferred embodiment of the present invention, a method which includes multiplying, in parallel, a pair of multi-bit binary numbers stored in a column of an associative memory array. The multiplying includes generating partial products of the pair and repeatedly performing a 3 to 2 replacement of the partial products.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that a multi-purpose associative memory device may improve the complexity of the overall multiplication process by concurrently processing all bits of the partial products when adding them in the final step, avoiding the carry propagation delay when adding all partial products, except for the last two partial products.

Multi-purpose associative memory devices that may be used are described in U.S. Pat. No. 8,238,173 (entitled "USING STORAGE CELLS TO PERFORM COMPUTATION"); U.S. patent application Ser. No. 14/588,419, filed on Jan. 1, 2015, now published as Publication No. 2015/0131383 (entitled "NON-VOLATILE IN-MEMORY COMPUTING DEVICE"); U.S. patent application Ser. No. 14/555,638 filed on Nov. 27, 2013, now issued as U.S. Pat. No. 9,418,719 (entitled "IN-MEMORY COMPUTATIONAL DEVICE"); U.S. Pat. No. 9,558,812 (entitled "SRAM MULTI-CELL OPERATIONS") and U.S. patent application Ser. No. 15/650,935 filed on Jul. 16, 2017 (entitled "IN-MEMORY COMPUTATIONAL DEVICE WITH BIT LINE PROCESSORS"), all incorporated herein by reference and assigned to the common assignee of the present invention.

Figure 2:
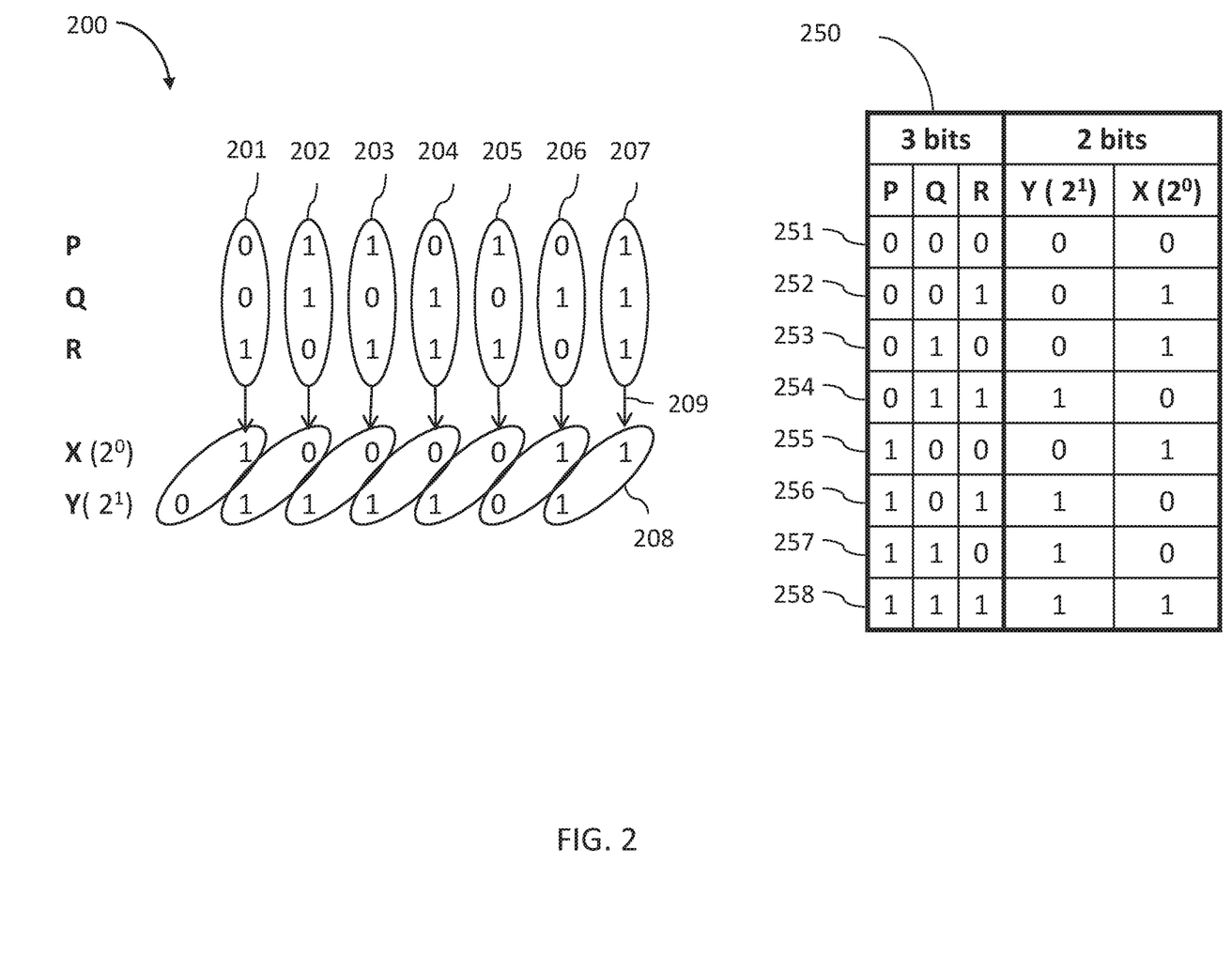
FIG. 2 is a schematic illustration of a 3 to 2 substitution in a single step, operative in accordance with a preferred embodiment of the present invention, using a standard full adder truth table.

Applicant has further realized that, for every three bits to be added together (i.e. three addends), it is possible to substitute them with two addends in a single step using a standard full adder truth table as described in FIG. 2, to which reference is now made. Table 250 is a truth table describing the result bits X and Y when adding together three bits P, Q and R, where X is the number of units or "ones" ($2^0$ and Y is the number of twos ($2^1$). Exercise 200 is an example of how truth table 250 may be used when adding three binary numbers to provide two alternate binary numbers X and Y which may produce the same result.

In exercise 200, three multi-bit numbers P, Q and R are arranged one below the other as would have been arranged for a long addition operation. In each column, the three binary bits, one bit from P, one bit from Q and one bit from R (surrounded by an ellipse) may be replaced (marked with an arrow) with two new binary bits X and Y (again surrounded by an ellipse), where X represents the value of ones and Y represents the values of twos. Therefore, the value of Y may be shifted one location to the left.

For example, the bits of P, Q and R in column, surrounded by ellipse 207 are 1, 1 and 1 respectively, and the applicable values of X and Y, for the values of ellipse 207 are those of matching row 258 of table 250. The replacement, marked by arrow 209, may provide the values of X and Y, surrounded by ellipse 208. It may be appreciated that the value of bit Y is shifted one location to the left with respect to the value of X of replacement 208 since Y provides the value of the twos ($2^1$) place.

Another example may be the bits of P, Q and R surrounded by ellipse 203, which are 1, 0 and 1, respectively and the applicable values of X and Y those of matching row 256 of table 250.

Figure 3:
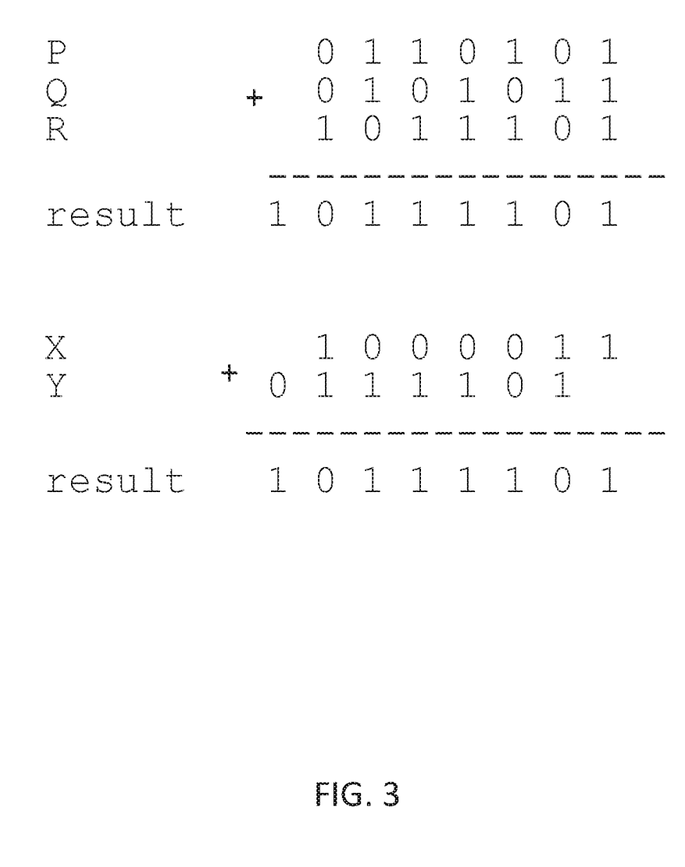
FIG. 3 is an illustration of the result of the sum operation between the original 3 multi-bit numbers and the replacement 2 multi-bit numbers.

It may be appreciated that the sum of P, Q and R is identical to the sum of X and Y as is schematically illustrated in FIG. 3 to which reference is now made, and therefore this replacement may be freely utilized. Thus, if P is 0110101, Q is 0101011 and R is 1011101 as shown in FIGS. 2 and 3, the result, 10111101, is the same as when the value of X (1000011) is added to the value of Y (0111101), with Y shifted one location to the left.

The operation of replacing three multi-bit binary number with applicable two other multi-bit binary numbers is referred herein as a three to two replacement, or 3 to 2 replacement.

It may be appreciated that the creation of X and Y for all columns of any three multi-bit binary numbers may be done concurrently in an associative memory device. It may be appreciated that the complexity of the 3 to 2 replacement is O(1).

As already mentioned hereinabove, a binary multiplication includes summing of several partial products together. Applicant has realized that the 3 to 2 replacement may be utilized in multiplication to improve the overall complexity of the multiplication. When multiplying two multi-bit binary numbers A and B, the value of each partial product may be either A or 0, and each relevant partial product may be used in the relevant step of the multiplication.

Returning to FIGS. 1, A and B are two 5-bit binary numbers in a multiplication operation. Using the 3 to 2 replacement, the number of sum operations may be reduced from four to one as is illustrated in FIGS. 4, 5 and 6 to which reference is now made.

Figure 4:
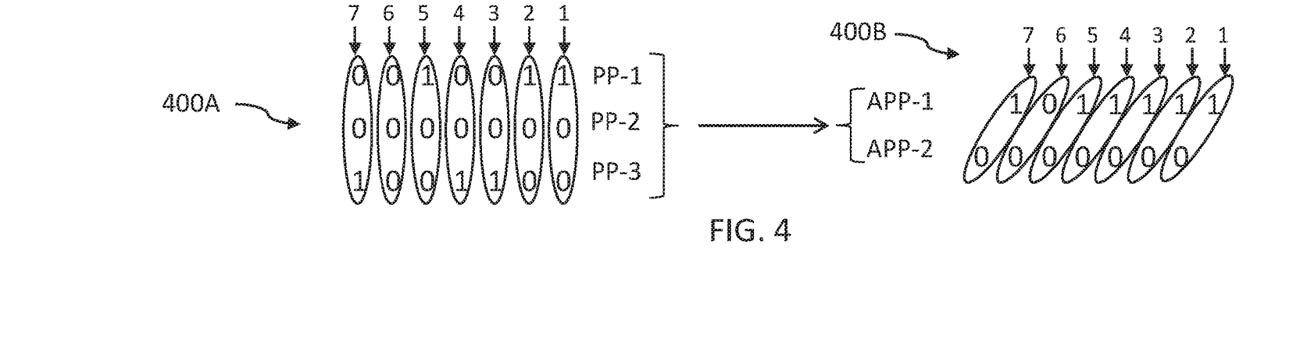
FIGS. 4, 5 and 6 are schematic illustration of the outcome of 3 to 2 replacement steps performed during the multiplication operation of FIG. 1.
Figure 5:
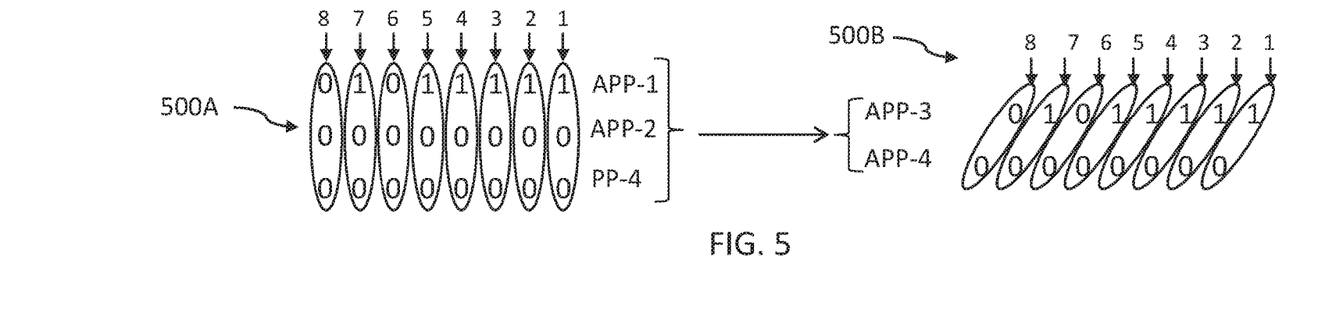

In the first step illustrated in FIG. 4, the 3 to 2 replacement operation may be performed on the first three partial products PP-1, PP-2 and PP-3, creating two new multi-bit accumulated partial products (APPs) APP-1 and APP-2. Each three bits surrounded by a numbered ellipse in 400A may be replaced by the 2 bits surrounded by an associated numbered ellipse in 400B. In the second step, illustrated in FIG. 5, a 3 to 2 replacement operation may be performed on APP-1, APP-2 and the next partial product PP-4, creating APP-3 and APP-4. It may be appreciated that all empty spaces created by the shift operation in 400B may be replaced by the value 0 in 500A. For example, the empty space of APP-2 surrounded by ellipse 1 in 400B of FIG. 4, may be replaced by 0 surrounded by ellipse 1 in APP-2 in 500A of FIG. 5.

Figure 6:
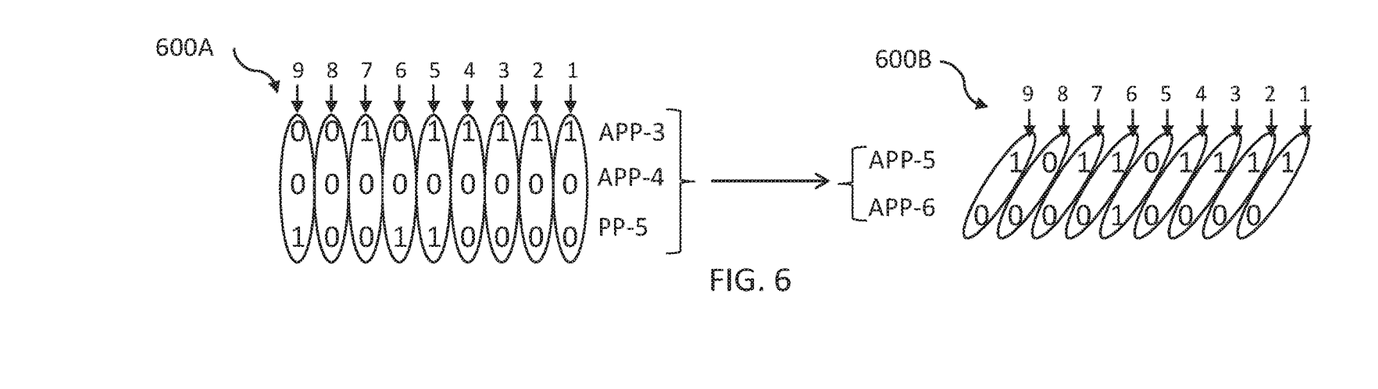

FIG. 6, to which reference is now made, is a schematic illustration of the third step of the example. In this step, the 3 to 2 replacement operation may be performed on the last partial product PP-5 and APP-3 and APP-4 to create APP-5 and APP-6.

It may be appreciated that this repetition of the 3 to 2 replacement operation may be done on binary numbers of any size, such as 16 bits, 32 bits and the like. When multiplying an n-bit multiplicand by an m-bit multiplier, the 3 to 2 replacement operation may be performed m−2 times. In the first round, the three binary numbers may be the first three partial products. In each next round, the 3 to 2 replacement may be performed on the two accumulated partial products from the previous round and the next partial product until the last partial product is handled, remaining with two last accumulated partial products. In the last step, the sum of the last two accumulated partial products, APP-5+APP-6 may be computed using any adding procedure with carry propagation.

Figure 7:
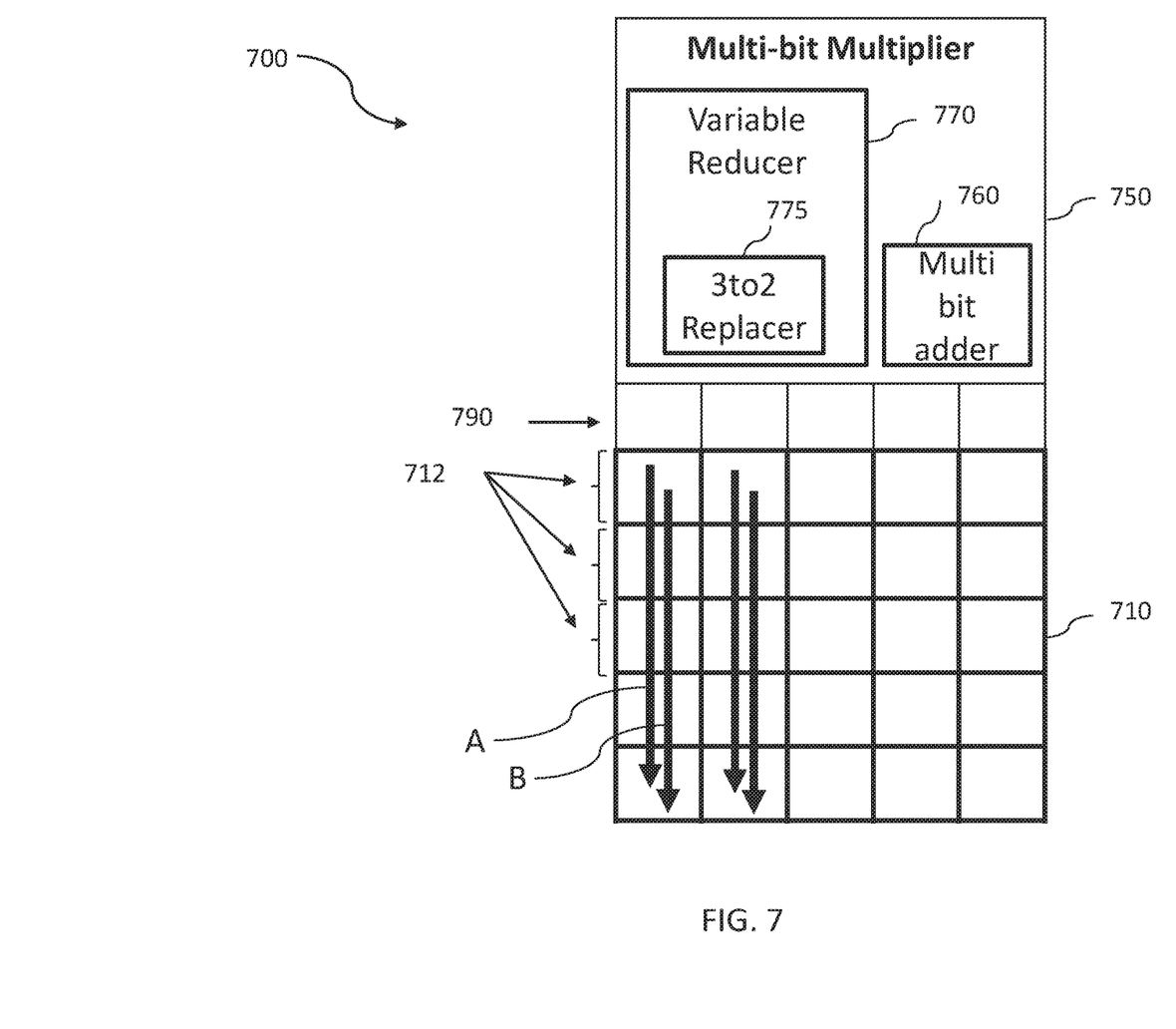
FIG. 7 is a schematic illustration of a multiplication system, constructed and operative in accordance with an embodiment of the present invention.

FIG. 7, to which reference is now made, is a schematic illustration of a multiplication system 700, constructed and operative in accordance with an embodiment of the present invention. Multiplication system 700 comprises an associative memory array 710 and a multi-bit multiplier 750.

Associative memory array 710 may comprise multiple sections 712, each section comprises cells arranged in rows and columns as described in detail in U.S. Pat. No. 8,238,173 (entitled "USING STORAGE CELLS TO PERFORM COMPUTATION"), in U.S. patent application Ser. No. 14/588,419, filed on Jan. 1, 2015 (entitled "NON-VOLATILE IN-MEMORY COMPUTING DEVICE"); in U.S. patent application Ser. No. 14/555,638 filed on Nov. 27, 2014 (entitled "IN-MEMORY COMPUTATIONAL DEVICE"), now issued as U.S. Pat. No. 9,418,719, or in U.S. Pat. No. 9,558,812 (entitled "SRAM MULTI-CELL OPERATIONS").

Multi-bit multiplier 750 further comprises a multi-bit adder 760 and a variable reducer 770 that further comprises a 3 to 2 replacer 775.

Multi-bit multiplier 750 may write an n-bit multiplicand A and an n-bit multiplier B in columns of memory array 710 and may perform the multiplication process with a final result stored in a multiplication result row 790. Multi-bit multiplier 750 may calculate the partial products during the multiplication procedure, may use variable reducer 770 to reduce the number of operands to be added in the final add operation to two, and may use multi-bit adder 760 to add the two variables and to provide the final result of the multiplication operation between multiplicand A and multiplier B in multiplication result row 790.

Variable reducer 770 may repeatedly use 3 to 2 replacer 775 to reduce the number of variables from n partial products to 2 final addends. 3 to 2 replacer 775 may replace three addends P, Q and R with two addends X and Y having the same sum as the original P, Q and R as described hereinabove. It may be appreciated that P, Q and R may be either partial products or accumulated partial products. Multi-bit adder 760 may be any multi-bit adder, such as the one described in U.S. patent application Ser. No. 15/690,301, entitled "CONCURRENT MULTI-BIT ADDER", now issued as U.S. Pat. No. 10,402,165, incorporated here by reference, or any other multi-bit adder.

Figure 8:
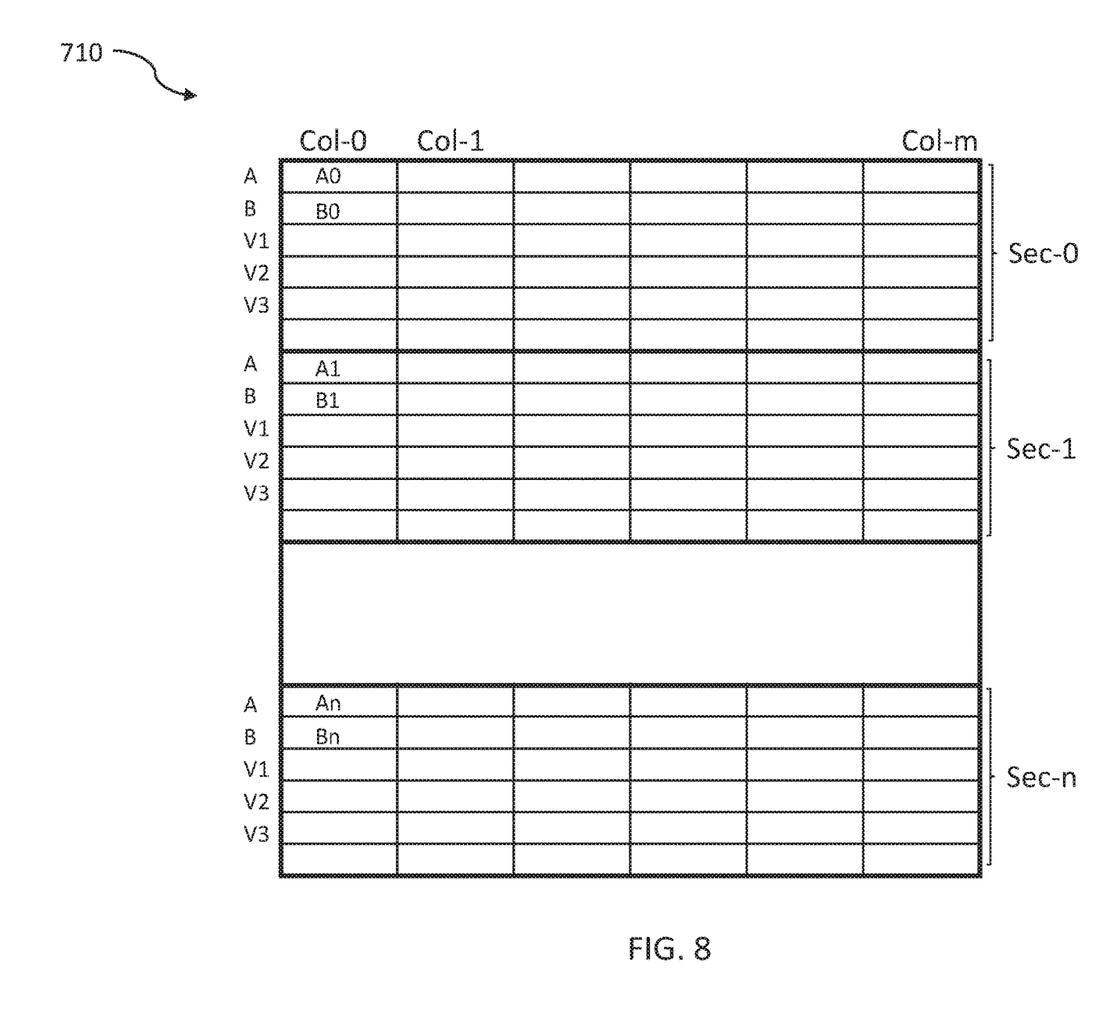
FIG. 8 is a schematic illustration of an arrangement of multiplication variables in the associative memory array of the multiplication system of FIG. 7.

FIG. 8, to which reference is now made, is a schematic illustration of an arrangement of multiplication variables in associative memory array 710. Multi-bit multiplier 750 may store a pair of variables to be multiplied in multiple sections of the same column of associative memory array 710. Bit j of variable A may be stored in row A of section j and bit j of number B may be stored in row B of section j. For example, the first pair of variables to be multiplied, A and B, may be stored in Col-0. Bit 0 of multiplicand A may be stored in row A of section 0 in column Col-0, bit 1 of multiplicand A may be stored in row A of section 1 of column Col-0 and so on. Similarly, Bit 0 of multiplicand B may be stored in row B of section 0 in column Col-0, bit 1 of multiplicand B may be stored in row B of section 1 in column Col-0, and so on. It may be appreciated that associative memory array 710 having m columns may concurrently perform m multiplication operations.

Multi-bit multiplier 750 may use three additional rows in each section, entitled V1, V2 and V3, to store three numbers to handle partial products (PPs) and/or accumulated partial products (APPs) in each step of the computation.

Figure 9:
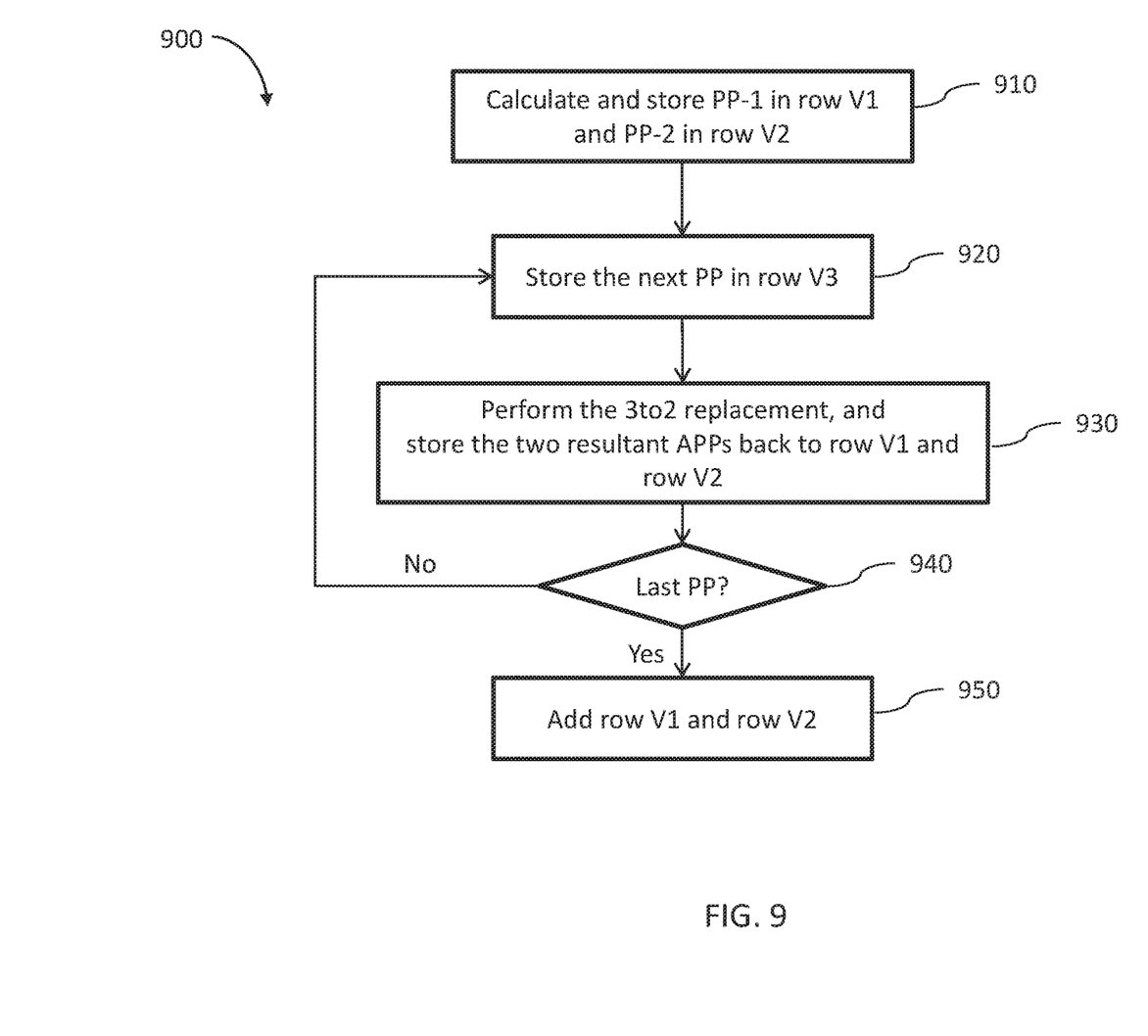
FIG. 9 is a flowchart describing the multiplication steps performed by the multiplication system of FIG. 7.

FIG. 9, to which reference is now made, illustrates a flowchart 900 describing the multiplication steps. Initially, in step 910, multi-bit multiplier 750 may store PP-1 in row V1 and PP-2 in row V2. Next in step 920, multi-bit multiplier 750 may store the next PP in row V3.

Variable reducer 770 may use 3 to 2 replacer 775 in step 930 to perform the 3 to 2 replacement on rows V1, V2 and V3 and may store the two resultant APPs back to rows V1 and V2. In step 940 variable reducer 770 may check whether the last PP has been handled. If it hasn't been handled, variable reducer 770 may return to step 920 to generate the next PP. If the last PP has been handled, multi-bit multiplier 750 may use multi-bit adder 760 to add the values stored in rows V1 and V2. It may be appreciated by the skilled person that the steps shown for flow 700 are not intended to be limiting and that the flow may be practiced with more or less steps, or with a different sequence of steps, or any combination thereof.

It may be appreciated that the result of the multiplication of two n-bit numbers is a number of up to 2n bits. The size (the number of bits) of each computed PP is larger by one bit than the previous PP, (except for the first PP whose size is n bits). Therefore, in the first step (handling the three first PPs), 3 to 2 replacer 775 may operate on n+2 bits. In each activation, 3 to 2 replacer 775 needs to handle larger operands (since the number of bits stored in rows V1, V2 and V3 increase).

For multiplying two 5-bit numbers, for example, 3 to 2 replacer 775 should first handle 7-bit operands, then, it should handle 8-bit operands and in the last activation, 3 to 2 replacer 775 should handle 9-bit operands, as can be seen in FIGS. 4, 5 and 6 described hereinabove.

Applicant has realized that the value of the LSB of the first APP created by 3 to 2 replacer 775 (the APP of the $2^0$) is always identical to the LSB of row V1 (since the value of both the LSB of row V2 and the LSB of row V3 are always 0).

Applicant has further realized that the value of the MSB of the second APP created by 3 to 2 replacer 775 (the APP representing of the $2^1$) is always identical to the value of the MSB of V3 (since the value of both the MSB of row V1 and the MSB of row V2 are always 0).

Applicant has realized that, since the LSB of the first APP and the MSB of the second APP are never changed by 3 to 2 replacer 775, it is possible to use 3 to 2 replacer 775 only on the n middle bits of the three variables, without the LSB of the row V1 and without the MSB of row V3.

Variable reducer 770 may store the LSB of row V1 of the first activation of 3 to 2 replacer 775 as the first bit of the evolving final result. In each consecutive operation of 3 to 2 replacer 775, variable reducer 770 may concatenate the LSB of row V1 to the left of the evolving final result (becoming the temporary MSB of the evolving final result). Variable reducer 770 may temporarily store the MSB of row V3 and may concatenate it as an MSB to row V1 in the next operation of 3 to 2 replacer 775.

Figures 10, 11:
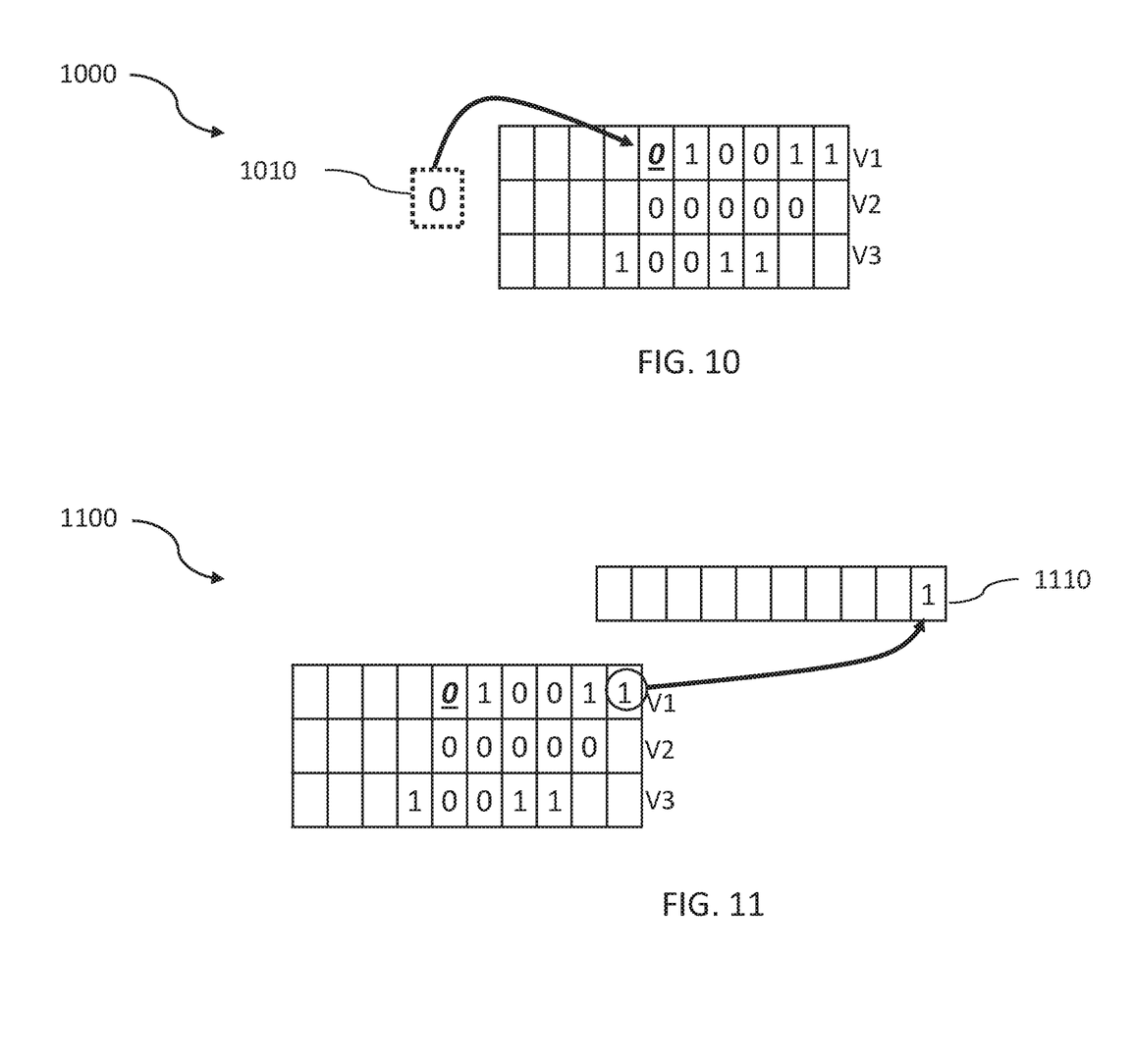
FIGS. 10, 11, 12 and 13 are schematic illustrations of the operation performed by the variable reducer and the 3 to 2 replacer in each step of the computation keeping the size of the operands constant, according with a preferred embodiment of the present invention.
Figure 12:
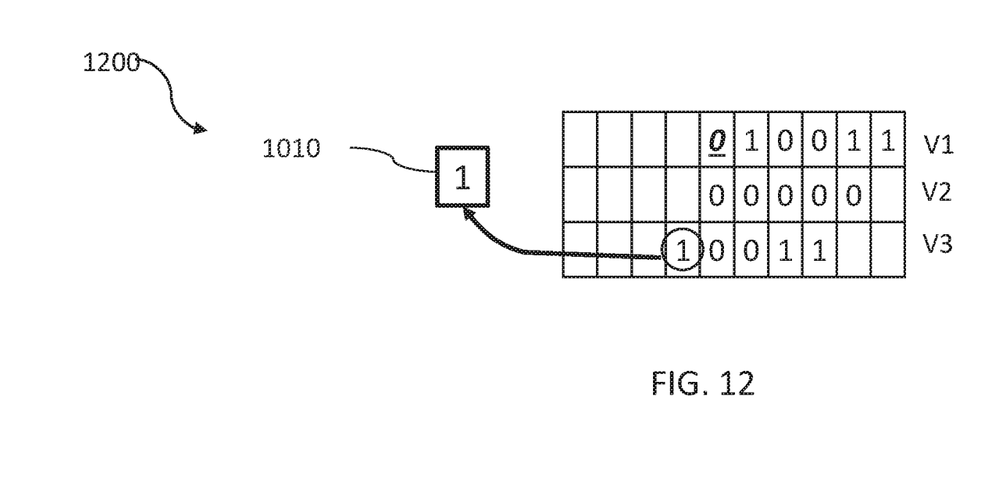
Figure 13:
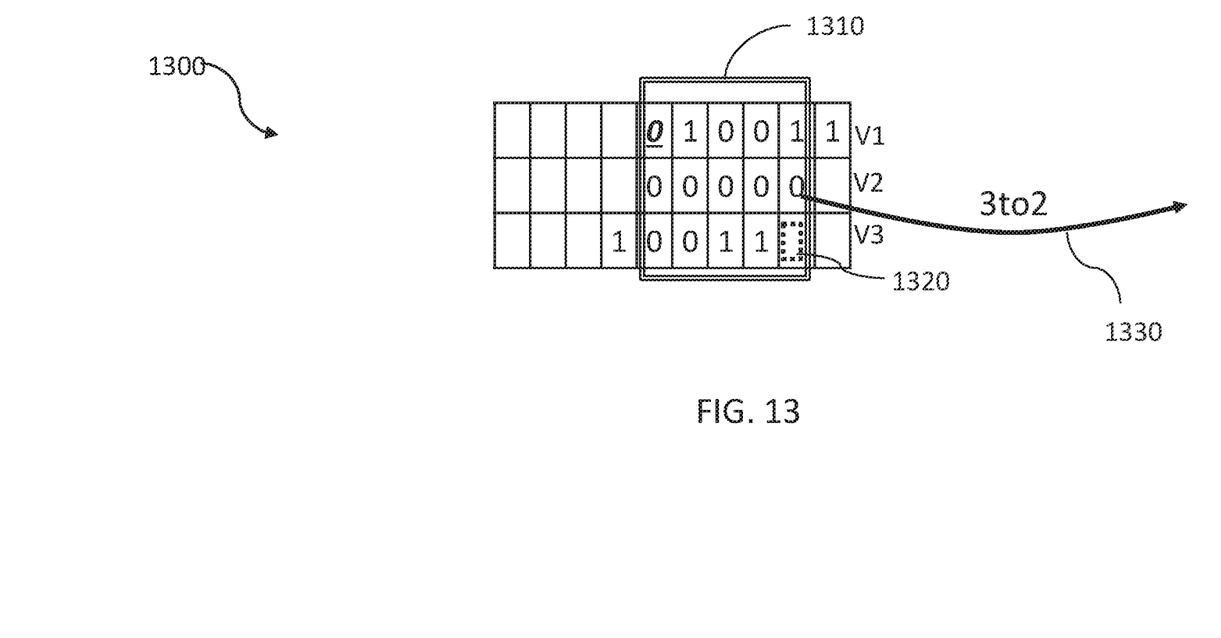

FIGS. 10, 11, 12 and 13, to which reference is now made, are schematic illustrations of the operation of variable reducer 770 and 3 to 2 replacer 775 in each step of the computation to keep the size of the operands handled by 3 to 2 replacer 775 to n bits only. In FIG. 10, in MSB append operation 1000, variable reducer 770 may concatenate a value stored in a temporary MSB store 1010 as the MSB of row V1. Temporary MSB store 1010 may be initiated to 0, for the first activation of 3 to 2 replacer 775. In FIG. 11, in LSB store operation 1100, variable reducer 770 may store the LSB of row V1 in a final result 1110. In FIG. 12, in MSB store operation 1200, variable reducer 770 may store the MSB of row V3 in temporary MSB store 1010 to be used in the next step and in FIG. 13, in reduce operation 1300, variable reducer 770 may activate replacer 775 on the "middle" n bits of rows V1, V2 and V3 surrounded by square 1310 to perform the 3 to 2 operation 1330. As mentioned before, the value in empty space 1320 is actually 0.

Figure 14:
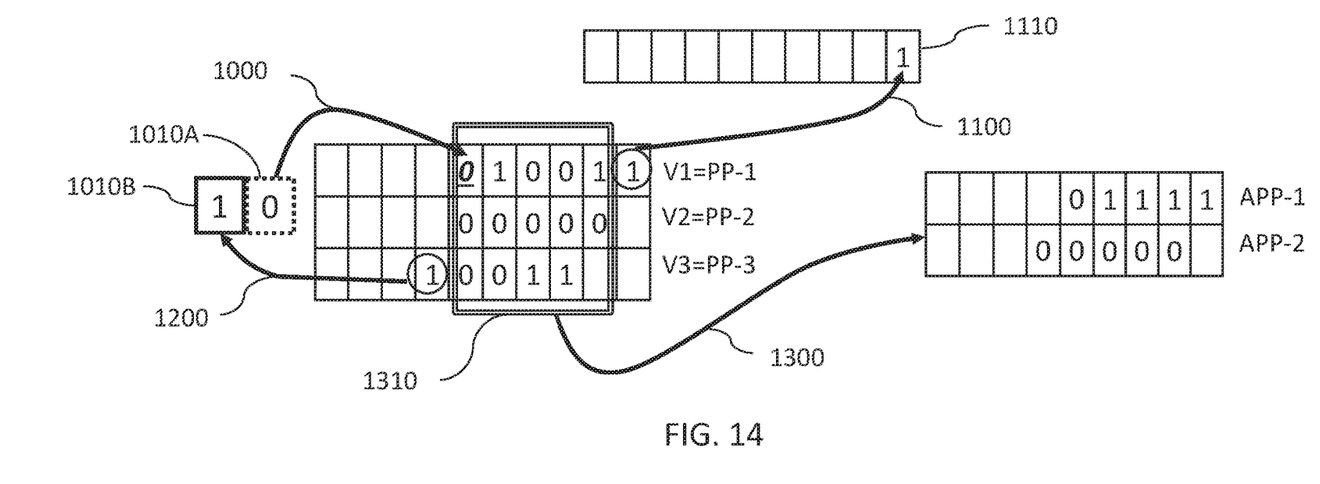
FIGS. 14, 15 and 16 are schematic illustrations of employing the operations described with regards to FIGS. 10, 11 12 and 13 in the example of multi-bit multiplication of FIG. 1.
Figure 15:
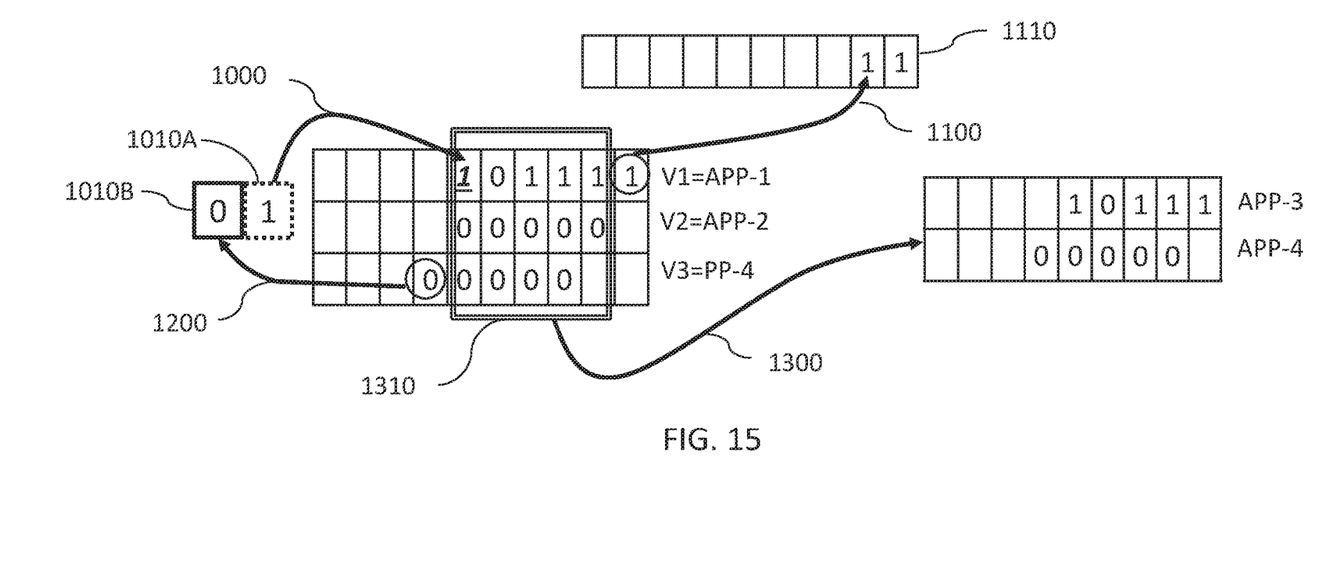
Figure 16:
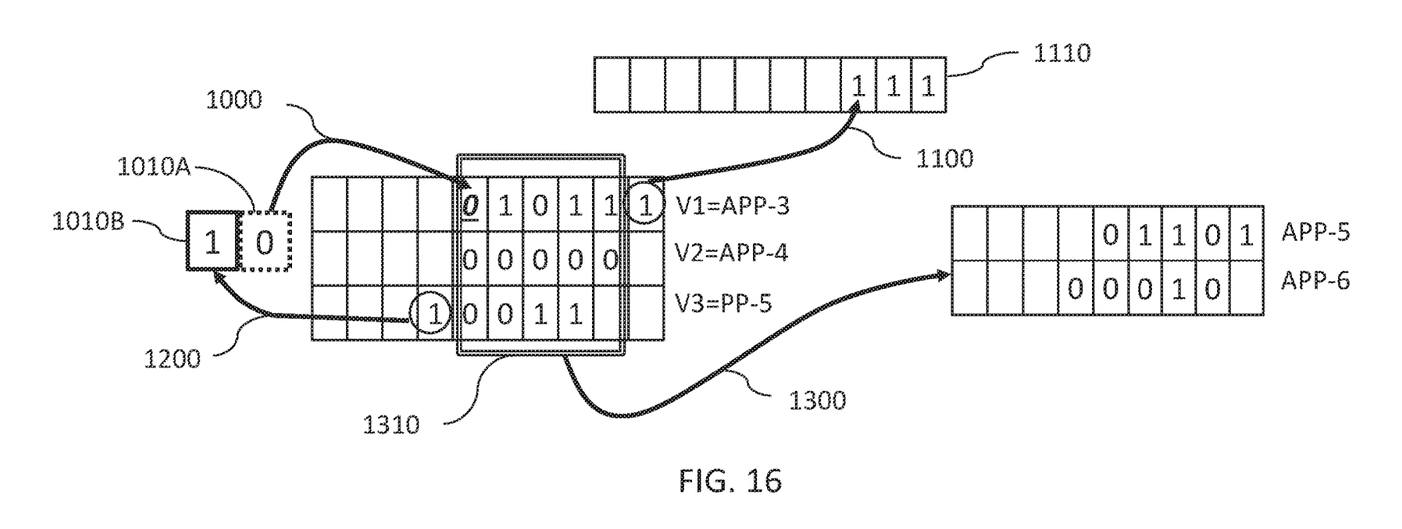

FIGS. 14, 15 and 16, to which reference is now made, are schematic illustrations of employing the operations of MSB append 1000, LSB store 1100, MSB store 1200 and reduce 1300, described with regards to FIGS. 10, 11 12 and 13 hereinabove, in the example of multi-bit multiplication 100 of FIG. 1.

In FIG. 14, the first three partial products, PP-1, PP-2 and PP-3 may be stored in rows V1, V2 and V3 respectively. In operation 1000, the value from temporary MSB store 1010A may be concatenated as the MSB of row V1. In operation 1100, the LSB of row V1 may be stored in final result 1110. In operation 1200, the MSB of row V3 may be stored in temporary MSB store 1010B and in operation 1300, the 3 to 2 reduction may be performed on the 5 middle bits of rows V1, V2 and V3 to create APP-1 and APP-2. It may be appreciated that MSB store 1010A and MSB store 1010B may be the same store storing different values over time. In FIGS. 15 and 16, The first resultant may be stored in row V1, the second resultant APP may be stored in row V2, the next PP may be stored in row V3 and the same operations, in the same order as in FIG. 14, may be performed to produce the next APPs and the bit of the result.

Figure 17:
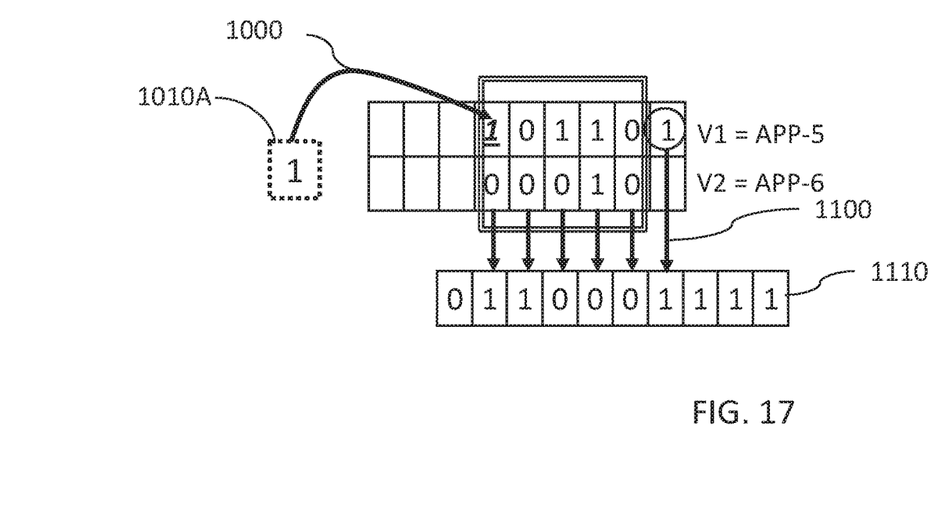
FIG. 17 is a schematic illustration of the sum operation performed on the last accumulated partial products.

FIG. 17, to which reference is now made, is a schematic illustration of the sum operation performed on the last accumulated partial products APP-5 and APP-6 to provide the value of the final result. Operation 1000 may be repeated, concatenating the value from temporary MSB store 1010A as the MSB of row V1, and operation 1100 may be repeated, storing the LSB of row V1 in final result 1110. Next, a standard add operation may be performed on the "middle" 5 bits of rows V1 and V2 and the sum may be stored as the MSB of final result 1110.

It may be appreciated that final result 1110 may occupy 2n bits. It will also be appreciated that, although in the current example the value of the MSB of final result 1110 is 0, it may be 1 if the value of the MSB of both rows V1 and V2 is 1.

Figure 18:
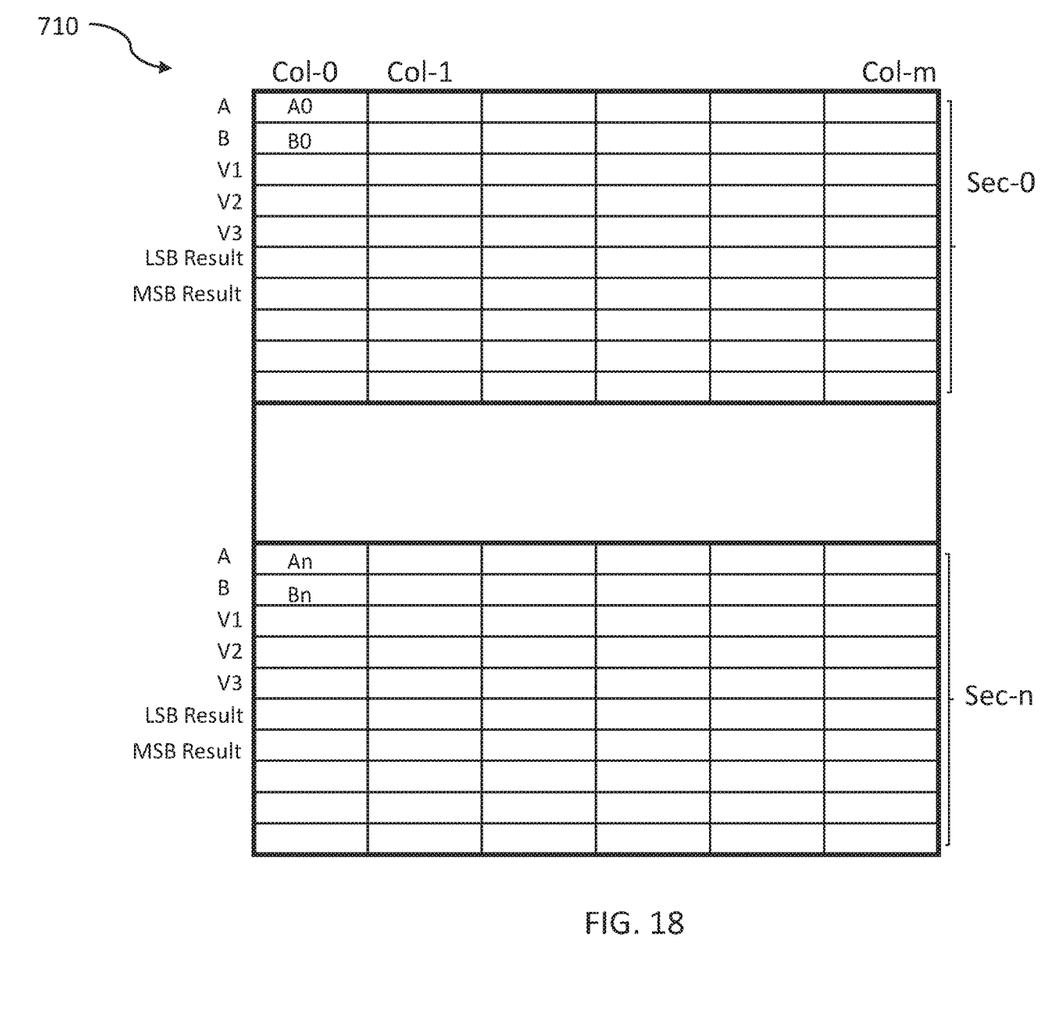
FIG. 18 is a schematic illustration of a memory arrangement for storing a result of the multiplication.

As already mentioned above, the size of final result 1110 may be 2n, when the size of both variables is n. As discussed before, bit j of variable A and bit j of variable B may be stored in section j of associative memory array 710. The n-bit variables may be stored in n sections, but final result 1110 may need 2n sections in order to be stored. Applicant has realized that using 2 rows of each section to store final result 1110 may reduce the number of sections needed for storing final result 1110 from 2n back to n. The first n bits (0 to n−1) may be stored in an "LSB result" row and the last n bits (n to 2n−1) may be stored in an "MSB result" row as illustrated in FIG. 18 to which reference is now made. It may be appreciated that the number of rows in a section of associative memory array 710 may be any number of rows, and each row in a section may be used for different purposes, such as but not limited to, storing a variable, storing intermediate results, storing final results and the like. Some rows may be used in one part of a computation, some in other parts some may not be used at all and so on.

Figure 19:
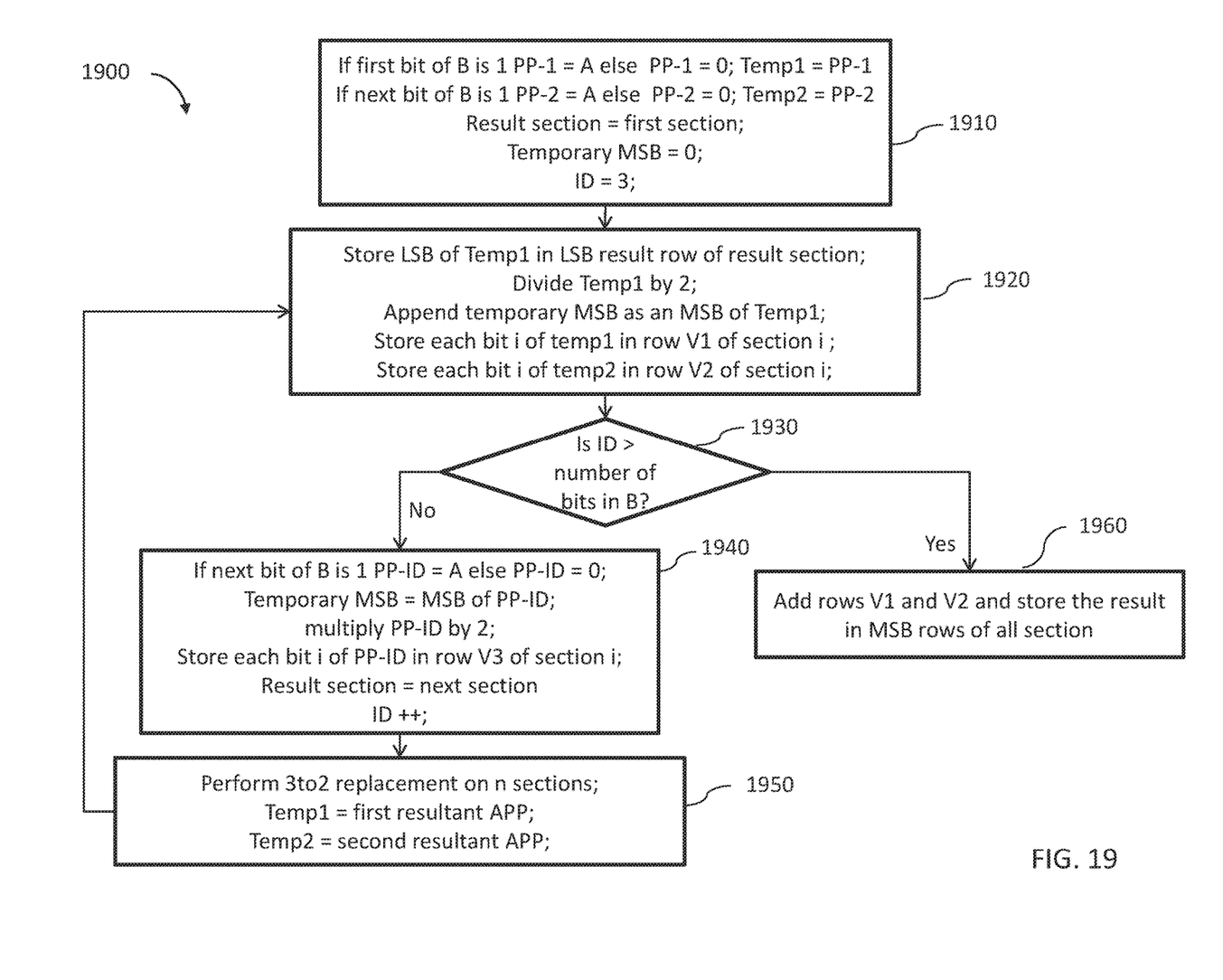
FIG. 19 is a flowchart describing the multiplication steps using a constant number of sections of FIG. 18.

FIG. 19, to which reference is now made, is a flowchart 1900 to compute the multiplication result of two n-bit numbers using only n sections.

In step 1910, variable reducer 770 may calculate the first two partial products, PP-1 and PP-2, and may store them in temporary variables Temp1 and Temp2 respectively. The result section, i.e. the location where the first bit of final result 1110 may be stored, may be initialized to be the first section of the array. A temporary MSB storing the value of MSB store 1010 may be initialized to 0 and an identifier ID of a PP may be initialized to 3, as the first two PPs have been already calculated.

In step 1920, variable reducer 770 may store the LSB of Temp1 in LSB result row of the result section (which is the first section when first activated). After storing the LSB, variable reducer 770 may divide Temp1 by 2 by performing a right shift to the bits of Temp1. In addition, variable reducer 770 may append the value stored in temporary MSB 1010 as an MSB of Temp1, in the vacant place created by the right shift. Variable reducer 770 may then store each bit i of temp1 in row V1 of section i and each bit i of temp2 in row V2 of section i.

In step 1930 variable reducer 770 may check if all bits of multiplier B have been handled. If the ID is higher than the number of bits of B, all bits have been handled and variable reducer 770 may continue to step 1960 where it may perform a standard add operation between V1 and V2 and may store the sum in the MSB result rows of the associated sections. If the ID is smaller or equal to the number of bits of B variable reducer 770 may continue to step 1940 to handle the next bit of B, which was not handled yet.

In step 1940 variable reducer 770 may calculate PP-ID which is the next PP to handle (PP-ID is PP-3 when first activated). Variable reducer 770 may append the temporary MSB 1010 as the MSB of PP-ID, multiply PP-ID by 2 and store each bit i of PP-ID in row V3 of section i. Variable reducer 770 may update the result section to be the next section and may increment the ID to indicate the next PP to handle.

In step 1950 variable reducer 770 may perform the 3 to 2 replacement on n sections, may store the first resultant APP and the second resultant APP in Temp1 and Temp2 respectively and may return to step 1920.

It may be appreciated that the LSB of row V1 is stored in LSB result row of the result section prior to performing the right shift operation and therefore, no data may be lost during this shift. Similarly, the value of the MSB of V3 is stored in temporary MSB 1010 prior to performing the left shift operation and therefore, again, no data may be lost during this shift operation.

It may be appreciated that the multiplication process described hereinabove, may, in a single step, reduce the number of multi-bit operands in a long addition from three to two while concurrent processing all bits of the operands without having to wait for a carry to propagate as in the standard multi-bit addition operation. The complexity of multiplying two n-bit numbers in the present invention may be O(2n) which is, in effect, O(n) (in each step of the computation, one bit of the result is generated, i.e. n steps, and there may be n additional steps for adding the last two operands using standard carry propagation) while the complexity of the standard multiplication operation is $O(n^2)$.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for an associative memory device, the method comprising:
   replacing a set of three multi-bit binary numbers P, Q and R, stored in said associative memory device, with two multi-bit binary numbers X and Y, also stored in said associative memory device, wherein a sum of said binary numbers P, Q and R is equal to a sum of said binary numbers X and Y.

2. The method of claim 1 and also comprising having a plurality of sets i of three multi-bit binary numbers $P_i$, $Q_i$ and $R_i$ and concurrently performing said replacing on said plurality of sets i.

3. The method of claim 1 wherein said replacing comprises:
   concurrently, for each location j of binary numbers P, Q and R, placing a first bit in a location j of said binary number X and a second bit in a location k of said binary number Y, said first bit being a sum bit and said second bit being a carry bit according to a full adder truth table, and said location k representing a value greater by a power of two than the value in location j.

4. The method of claim 1 and also comprising:
   having n multi-bit binary addends;
   repeatedly performing said replacing on sets of three of said multi-bit binary addends until there are only two final multi bit binary addends left; and
   performing a standard multi bit add operation on said final two multi bit binary addends providing a sum of said n multi-bit binary addends.

5. The method of claim 1 and also comprising:
   having two multi-bit binary numbers to be multiplied;
   initially putting bits of a first partial product of said two multi-bit binary numbers into said binary number P and bits of a second partial product into said binary number Q;
   placing bits of a next partial product in said binary number R;
   performing said replacing;
   putting bits of said multi-bit binary number X into said multi-bit binary number P and bits of said multi-bit binary number Y into said multi-bit binary number Q;
   repeating said placing, performing and putting until said next partial product is a last partial product; and
   performing a standard multi bit add operation on said multi-bit binary numbers P and Q thereby providing a result of a multiplication operation between said two multi-bit binary numbers.

6. The method of claim 5 wherein said first performing comprises:
   placing a most significant bit (MSB) of said multi-bit binary number R in a temporary location in said associative memory device;
   storing a least significant bit (LSB) of said multi-bit binary number P in a first free location of said result, starting from the LSB of said result; and
   placing a bit from said temporary location as an MSB of said multi-bit binary number P, thereby keeping a constant number of bits in each of said multi-bit binary numbers P, Q and R.

7. A system comprising:
   an associative memory array arranged in rows and columns storing three original multi-bit binary numbers P, Q and R in each column of said associative memory array; and
   a 3to2 replacer to concurrently replace, in parallel in all columns said original multi-bit binary numbers P, Q and R with two replacement multi-bit binary numbers X and Y wherein a sum of said original multi-bit binary numbers P, Q and R is equal to a sum of said replacement multi-bit binary numbers X and Y.

8. The system of claim 7 wherein concurrently for each bit j of multi-bit binary numbers P, Q and R stored in each column, said 3to2 replacer to place a first bit in a location j of said multi-bit binary number X and a second bit in a location k of said multi-bit binary number Y, wherein said first bit is a sum bit and said second bit is a carry bit according to a full adder truth table, and said location k to store a value greater by a power of two than the value stored in location j.

9. The system of claim 7 said associative memory array to store a plurality of multi-bit binary addends and said system also comprising:
   a variable reducer to repeatedly activate said 3to2 replacer on groups of three multi-bit binary numbers, wherein each group comprises a first, a second and a third multi-bit binary addend from said plurality of multi-bit binary addends, until there are only two final multi bit binary addends left; and
   a multi-bit adder to calculate a sum of said final two multi bit binary addends thereby to provide a sum of said plurality of multi-bit binary addends.

10. The system of claim 9 said associative memory array to store a pair of multi-bit binary numbers to be multiplied and also comprising
    a multi-bit multiplier to generate partial products of said pair, to activate said variable reducer on said partial products and to activate said multi bit adder to provide a multiplication result between said pair.

11. A system comprising:
    An associative memory array having rows and columns, each column of said array to store two multi-bit binary numbers to be multiplied; and
    a multi-bit multiplier to multiply, in parallel, said two multi-bit binary numbers per column by concurrently processing all bits of partial products generated by said multiplier, said multiplier performing said processing without any carry propagation delay when adding all but the last two partial products.

12. A method comprising:
    multiplying, in parallel, a pair of multi-bit binary numbers stored in a column of an associative memory array, said multiplying comprising:
    generating partial products of said pair; and
    repeatedly performing a 3to2 replacement of said partial products.

* * * * *